United States Patent
Talagala et al.

(10) Patent No.: US 6,732,289 B1
(45) Date of Patent: May 4, 2004

(54) FAULT TOLERANT DATA STORAGE SYSTEM

(75) Inventors: Nisha Talagala, Fremont, CA (US); Whay Sing Lee, Newark, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 541 days.

(21) Appl. No.: 09/652,972

(22) Filed: Aug. 31, 2000

(51) Int. Cl.$^7$ ................................................ G06F 11/16
(52) U.S. Cl. .......................................................... 714/6
(58) Field of Search ............................. 714/6, 7, 8, 16, 714/55; 707/202

(56) References Cited

U.S. PATENT DOCUMENTS

| | | | | |
|---|---|---|---|---|
| 5,922,077 A | * | 7/1999 | Espy et al. ...................... | 714/7 |
| 5,928,367 A | * | 7/1999 | Nelson et al. ................... | 714/6 |
| 5,966,300 A | * | 10/1999 | Flood et al. ..................... | 700/2 |
| 6,247,099 B1 | * | 6/2001 | Skazinski et al. ............ | 711/141 |
| 6,279,078 B1 | * | 8/2001 | Sicola et al. ................. | 711/119 |
| 6,363,462 B1 | * | 3/2002 | Bergsten ...................... | 711/162 |
| 2001/0008019 A1 | * | 7/2001 | Vert et al. ....................... | 714/1 |

FOREIGN PATENT DOCUMENTS

| | | |
|---|---|---|
| EP | 551718 A | 7/1993 |
| EP | 681239 A2 | 11/1995 |
| EP | 875832 A1 | 11/1998 |

OTHER PUBLICATIONS

T10/995D, SCSI–3 Primary Commands, Mar. 28, 1997.

Sicola S.J. "The Architecture and Design of HS–Series Storageworks Array Controllers" Digital Technical Journal, Maynard, MA, US, vol. 6, No. 4, 1994.

* cited by examiner

*Primary Examiner*—Scott Baderman
(74) *Attorney, Agent, or Firm*—Blakely Sokoloff Taylor & Zafman, LLP

(57) ABSTRACT

A fault tolerant data storage system and related method are described for effectively failing over a storage device from one storage controller to another storage controller. The storage system generally includes at least two storage controllers for coupling to a processor and at least one storage device. A failover manager is in communication with the storage controllers and the storage device. The failover manager assists failing over of the storage device by allowing only one of the storage controllers having ownership to access the storage device at any one time. In one embodiment, the failover manager maintains a list of recent requests that have been committed to the storage device so that it can be used during failover to assist the surviving controller to complete the uncommitted requests properly.

27 Claims, 7 Drawing Sheets

FAULT TOLERANT DATA STORAGE SYSTEM

BACKGROUND OF THE INVENTION

1. Field of the Invention

The present invention generally relates to data storage systems, and in particular, to a fault tolerant data storage system.

2. Description of the Related Art

Multiple storage controllers may be used to address the problem of storing and retrieving data when one storage controller fails. FIG. 1 depicts a simplified representation of a conventional data storage system 100 with redundant storage controllers. The redundant storage controllers 102-1 and 102-2 are coupled between a processor 110 (e.g., server) and one or more storage devices 104-1 through 104-N (e.g., disk drives). One storage controller serves as a primary controller and the other controller serves as a secondary controller. In a normal mode, the processor 110 accesses one or more of the storage devices via the primary controller 102-1. If the primary controller 102-1 is detected to have failed by the processor 110, the secondary controller 102-2 becomes active and assumes the interfacing operations between the storage devices and the processor 110. When the controller 102-1 recovers, it may take over the storage devices again from the controller 102-2.

FIG. 2 depicts a simplified representation of another conventional storage system 200 with redundant storage controllers. In this example, a heartbeat mechanism 206 is provided between the redundant storage controllers 202-1 and 202-2 so that each storage controller can send a heartbeat signal to the other storage controller to periodically indicate that it is functioning properly. At least in some implementations, each storage controller determines if the other storage controller is operating normally. If one of the storage controllers determines that the other storage controller has failed, it will initiate the process of taking over the disk drives serviced by the failing storage controller.

These conventional redundant storage controller systems suffer from various disadvantages. For example, the state of the failing controller may be unpredictable, i.e., the failing controller may not be completely down or completely up. Consequently, it is possible that sometime after a surviving controller takes over disk drives that were being serviced by a failing controller, the failing controller not realizing that it has failed may become active (if it had hung) and start executing requests in its queue. If one controller repeats operations that have already been executed by the other controller, data may become corrupted and may not be trusted. Additionally, when the surviving controller takes over the disk drives, there may be some operations that have already been executed by the failing controller on the disk drives but have not yet been committed to the processor. As a result, the surviving controller may attempt to perform operations that have already been executed by the failing controller. As previously mentioned, data may be corrupted if the surviving controller repeats the operations that have already been executed by the failing controller.

Thus, there is a need to provide a system which addresses problems associated with failing over a storage device from one storage controller to another storage controller.

SUMMARY OF THE INVENTION

According to one aspect of the invention, a fault tolerant data storage system for effectively failing over a storage device from one storage controller to another storage controller is provided. The storage system generally includes at least two storage controllers for coupling to a processor and at least one storage device. A failover manager is in communication with the storage controllers and the storage device. The failover manager assists failing over of the storage device by allowing only one of the storage controllers having ownership to access the storage device at any one time. The failover manager maintains a list of recent requests that have been committed to the storage device so that it can be used during failover to assist the surviving controller to complete the uncommitted requests properly.

In one embodiment, the failover manager is embodied in the form of a software task executed by a processor included in a disk controller of a disk drive. In an alternative embodiment, the software task is executed by a processor included in a separate electronic unit coupled between storage controllers and one or more disk drives.

DETAILED DESCRIPTION OF THE INVENTION

One implementation of the present invention is described herein for purposes of illustration, namely a fault tolerant data storage system. The storage system of the present invention addresses problems associated with failing over a storage device from one storage controller to another storage controller. It should be noted that term "failover" in the context of the present invention is used to describe a process by which a secondary storage controller assumes the responsibilities (i.e., the interfacing operations between a storage device and a processor) of a primary storage controller in the event of failure of the primary storage controller. The term "failover" is also used to describe a reverse process by which the primary storage controller recovers control over the storage device from the secondary storage controller after it has been repaired or replaced.

According to one aspect of the invention, a failover manager is provided in the storage system to assist the storage controllers to failover properly. In accordance with another aspect of the invention, the failover manager is configured to enforce failover decisions by granting access to a storage device only to one of the storage controllers having ownership of the storage device at any one time. In accordance with yet another aspect of the invention, the failover manger maintains a list of recent requests that have been committed to a storage device so that a surviving controller may use this information during failover to properly complete uncommitted requests.

Figure 1:
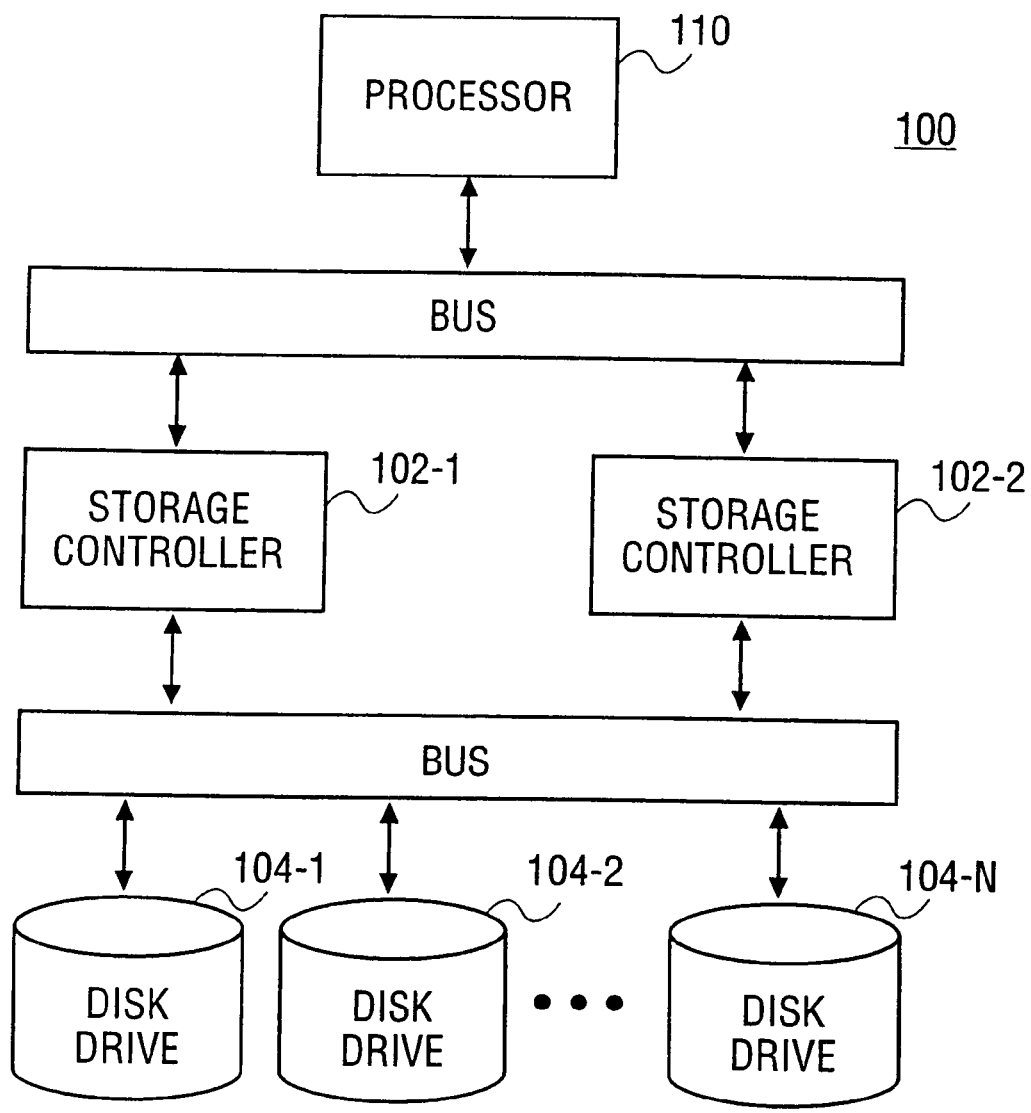
FIG. 1 is a block diagram of one example of a conventional storage system with redundant storage controllers.
Figure 2:
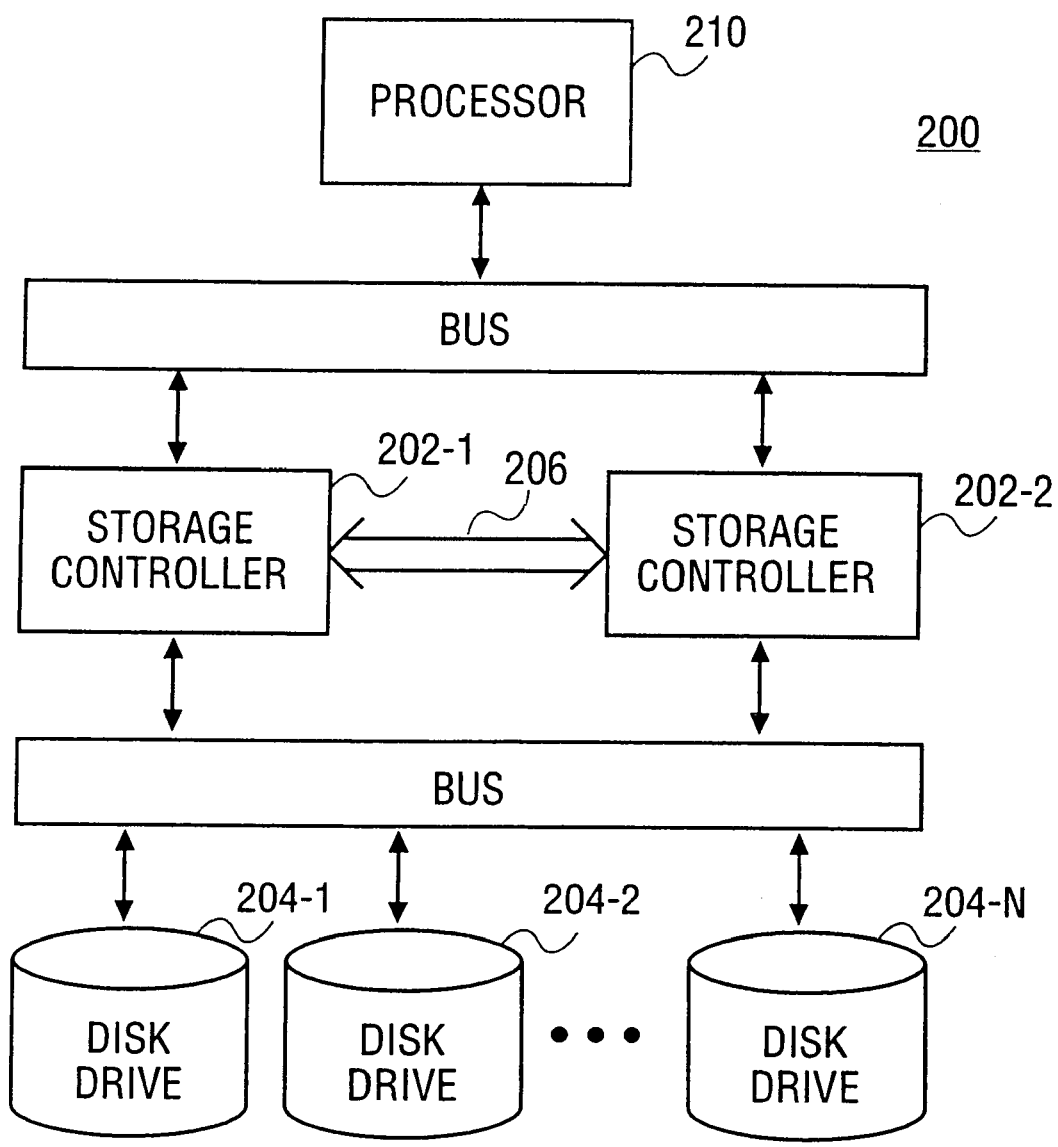
FIG. 2 is a block diagram of another example of a conventional storage system with a heartbeat mechanism between redundant storage controllers.
Figure 3:
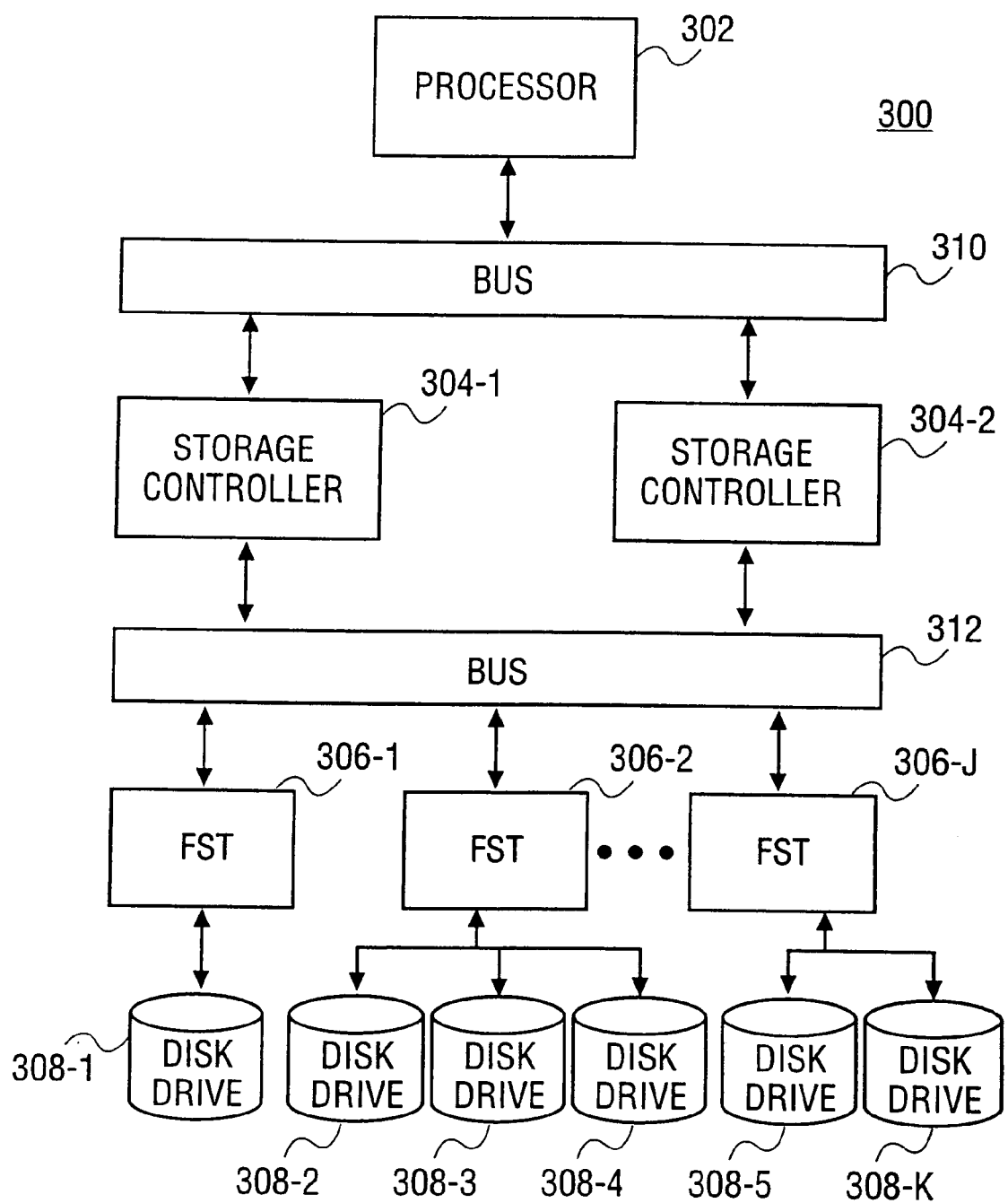
FIG. 3 is a block diagram of a fault tolerant data storage system according to one embodiment of the present invention.

FIG. 3 depicts a simplified representation of a fault tolerant data storage system 300 according to one embodiment of the present invention. The storage system 300 includes at least one processor 302 (e.g., server), a number of storage devices 308-1 through 308-K (e.g., disk drives) and at least two storage controllers 304-1 and 304-2 interconnected between the processor and the storage devices via a first bus 310 and a second bus 312. In one embodiment, the second bus 312 is embodied in the form of a Small Computer System Interface (SCSI) bus. In communication with the storage controllers 304 and one or more disk drives 308 are failover managers (referred hereinafter as failover software tasks "FST") 306-1 through 306-J. Each FST 306 may be in communication with only one disk drive or several disk drives. As shown, there can be many independent failover software tasks 306 running in the fault tolerant storage system 300 and each FST only enforces failover decisions for those disk drives that it is associated with.

When the storage system 300 first boots up, a default mapping may be used to determine which storage controller 304 has ownership of which disk drives 308. In one embodiment, during initialization, variables (referred hereinafter as current owner identifier data) are set by the FSTs according to the default mapping. In this regard, these variables are used by the FST to determine if a storage controller requesting an access to a disk drive actually has ownership of that disk drive. Alternatively, during initialization, each controller may read the default mapping and based thereon issue an ownership request to corresponding FSTs for ownership of disk drives as specified in the mapping.

As an example, assume that one of the storage controllers 304-1 has ownership of a disk drive 308-1 when the storage system 300 first boots up and the processor 302 accesses the disk drive 308-1 through the storage controller 304-1 and the FST 306-1. When one of the storage controllers 304 makes a request to access the disk drive 308-1, the FST 306-1 acts as a gatekeeper to the disk drive 308-1 and will prescreen each request by verifying that the storage controller making the request has a proper access ownership. This verification of ownership will be described more in detail with reference to FIG. 4. The controller having current ownership will be referred hereinafter as a primary controller and the other controller which serves as a redundant controller will be referred as a secondary controller. If the processor 302 determines that the primary controller 304-1 is unresponsive, the processor 302 sends a failover command to the secondary controller 304-2 to take over the disk drive 308-1. The secondary controller 304-2 will in turn send an ownership request to the FST 306-1 in response to the failover command received from the processor. Upon receiving the ownership request, the FST 306-1 will revoke ownership from the primary controller 304-1 and grant the ownership to the secondary controller 304-2.

Once the ownership has been granted to the requesting controller, the FST will retrieve a list of recent requests (e.g. write/read access requests) that have been received from the previous owner 304-1 and committed to the disk drive and transmit them to the current owner 304-2. The list of recent requests that have been committed to the disk drive is used by the new owner (e.g., controller 304-2) to complete the uncommitted requests correctly. For example, this may be accomplished by the current owner selectively executing only the requests in its queue that have not been committed to the disk drive, by for example, comparing the sequence number attached to each request in its queue against the sequence number attached to the requests contained in the list. In other words, the current owner (e.g., controller 304-2) will void all requests in its queue that are also specified in the list of recent requests as being already committed to the disk drive by the previous owner 304-1. Accordingly, by utilizing the list of recent requests maintained by the FST, the surviving controller is able to avoid performing operations that have already been executed by the failing controller. In this regard, the present invention provides a significant advantage over the conventional redundant storage controller systems which are susceptible to data corruption caused by one controller repeating operations that have already been executed by the other controller. According to another aspect of the invention, after granting of the ownership to the requesting controller, the FST 306-1 will delete all requests made by the previous owner that have not been committed to the disk drive to further prevent data corruption.

In one embodiment, the controllers 304-1 and 304-2 will not request ownership unless it has been specifically instructed by the processor 302. Therefore, in this embodiment, the processor 302 makes a decision as to which controller will own which disk drive, and the controllers 304-1 and 304-2, and the FST 306 enforce the decision made by the processor. Although only one FST 306-1 and only one disk drive 308-1 are mentioned in the above example, it should be noted that the secondary controller 304-2, in a multiple-disk-drive case, will need to request ownership from all FSTs associated with all disk drives that it plans to access.

Figure 4:
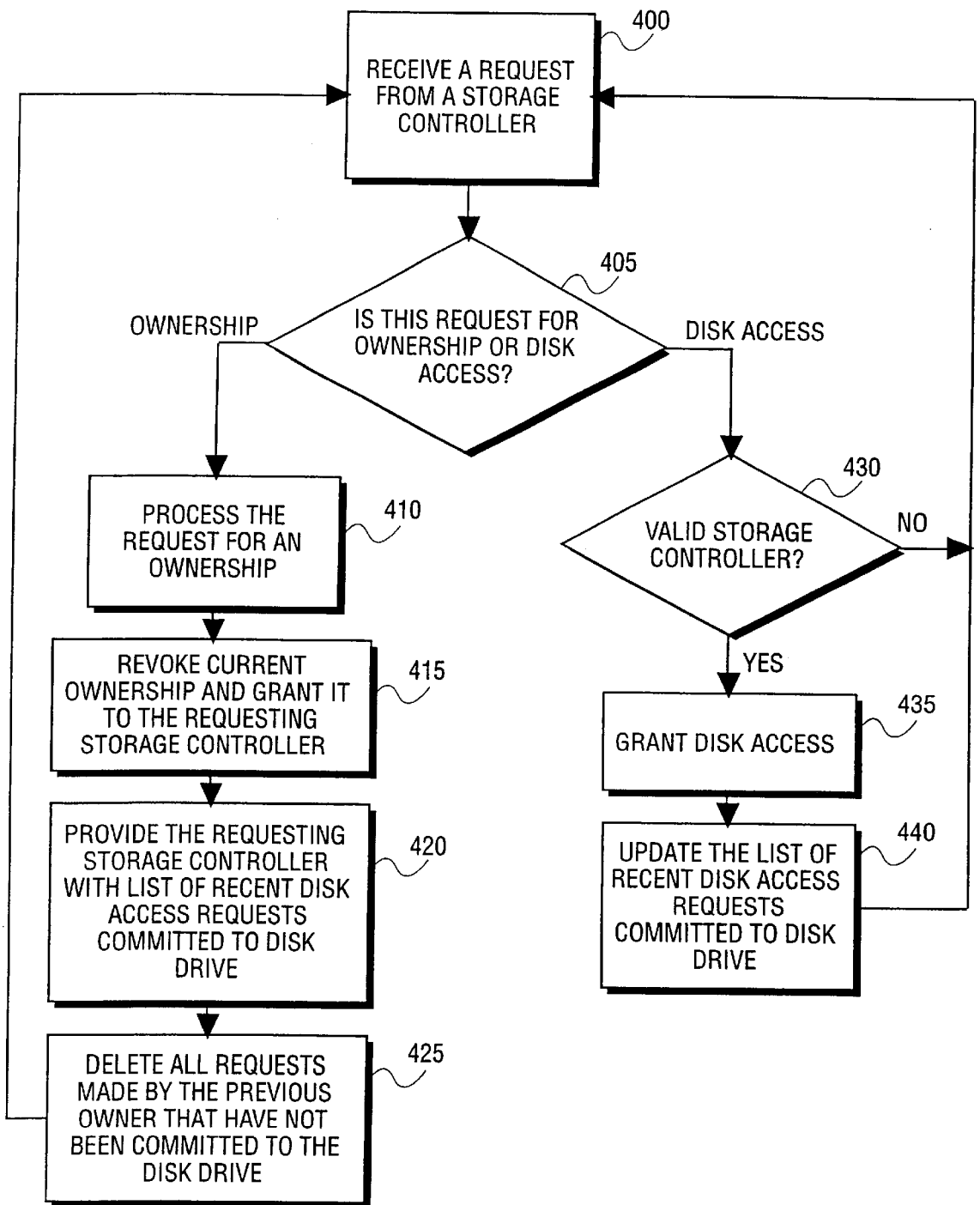
FIG. 4 is a flowchart diagram illustrating operations of a failover software task according to one embodiment of the present invention.

FIG. 4 depicts a flowchart of operations of a FST according to one embodiment of the present invention. In block 400, the FST receives a request from a storage controller. This request from the storage controller may be one of a request for ownership or a request for an access (e.g., read/write). In decision block 405, the FST processes the request to determine what type of request it is. If the request is for ownership (block 405, ownership), the FST proceeds to block 410. In one embodiment, the FST does not make any decision with regard to which controller will own which disk drive, but rather will grant ownership to any storage controller that asks for ownership. In this regard, once the FST receives a request for ownership of a particular disk drive from one of the storage controllers, the FST will revoke current ownership of that disk drive and grant the ownership to the requesting storage controller (block 415).

The revocation and granting of ownership may be accomplished by the FST setting a variable (current owner identifier data). Each FST maintains a list of current owner identifier data. Each current owner identifier data is assigned to each disk drive that the FST is associated with. To reflect ownership change, the FST updates its current owner identifier data by using an identification number (e.g., SCSI ID) of the controller requesting ownership. The current owner identifier data is subsequently used by the FST to determine whether a storage controller requesting an access to a particular disk drive actually has ownership to access that disk drive. Once the ownership has been granted to the requesting storage controller (block 415), the FST will retrieve a list of recent disk access requests that have been committed to the disk drive and send the list to the surviving controller (current owner) in block 420. The surviving controller (current owner) can use this information to complete the uncommitted requests correctly. In block 425, the FST deletes all data access requests that have been received from the previous owner but have not yet been committed to the disk drives. At this point, the software task returns to the beginning (block 400) where the next request is processed.

On the other hand, if the request from the storage controller is a disk access request (block 405, disk access), the FST proceeds to a decision block 430 where it determines whether the requesting storage controller currently has ownership of the disk drive it wants to access. In one embodiment, the verification of the ownership is accomplished by reading a storage controller identification number (e.g., SCSI ID) and comparing it to a current owner identifier data previously stored in a memory. If the FST determines that the requesting storage controller has current ownership of the disk drive (block 430, yes), it will grant access to the disk drive by passing the access request to the disk drive. Otherwise, if the requesting storage controller does not have current ownership (block 430, no), the FST will block the access to the disk drive by aborting the request. In block 440, the FST updates its list of recent disk access requests that have been committed to the disk drive. As noted above, this list of recent disk access requests is used by the surviving controller (new owner) to complete the uncommitted requests properly. In either case (block 430, no) or (block 400), the software task returns to the beginning (block 400) proceeds with a next request.

In one embodiment, the FST is embodied in the form of a software task executed by a local processor included in a disk controller of a disk drive. In this embodiment, the list of recent requests maintained by the FST is stored in a local memory such as a RAM (random access memory) integrated into the disk controller. In an alternative embodiment, the FST is executed by a processor included in a separate electronic unit coupled between storage controllers 304 and one or more disk drives 308.

Figure 5:
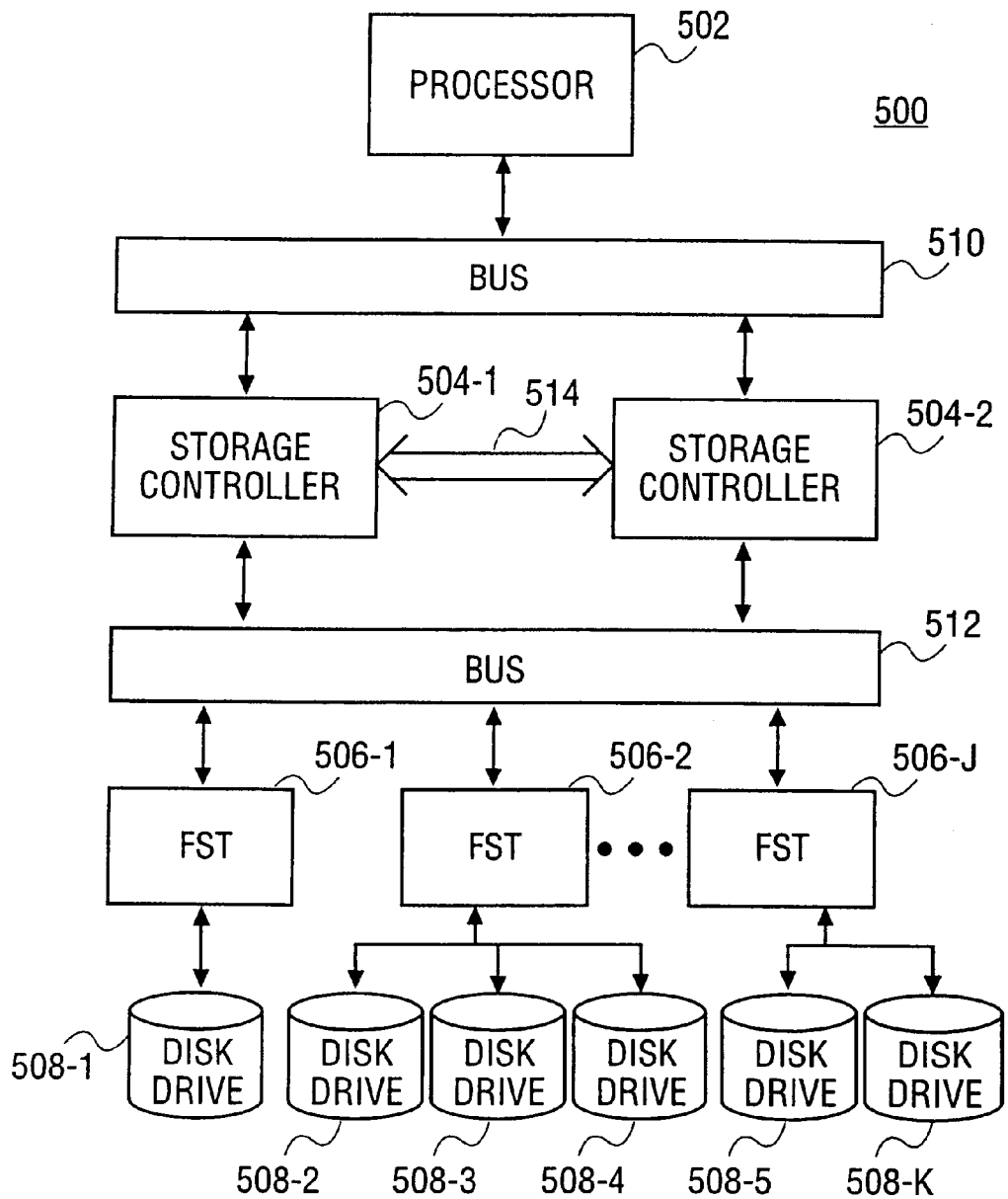
FIG. 5 is a block diagram of a fault tolerant data storage system according to another embodiment of the present invention.

FIG. 5 depicts a simplified representation of a fault tolerant data storage system 500 according to another embodiment of the present invention. In this embodiment, a heartbeat mechanism 514 is provided between storage controllers 504-1 and 504-2, wherein a heartbeat signal is transmitted between the controllers to keep each informed that the other controller is operating properly. If one of the controllers 504 is unresponsive to the heartbeat signal, the other controller will take over the disk drives serviced by the unresponsive controller by requesting for ownership to those FSTs 506 associated with all disk drives 508 that were previously serviced by the failing controller. In one implementation, the processor 502 is not involved in the decision as to which storage controller 504 will own which disk drives 508. Rather, this decision is made by individual storage controllers which constantly sends/receives a heartbeat signal to/from the other storage controller to determine if the other controller is active, or not.

Interruption of the heartbeat signal can result if (1) the heartbeat mechanism 514 is down or (2) one of the controllers 504 is experiencing a failure condition (e.g., inactive). In one embodiment, one of the storage controllers 504 (e.g., secondary controller) will initially assume that the other controller (e.g., primary controller) has failed once an interruption of the heartbeat signal is sensed. Based on this assumption, the secondary controller will initiate a failover sequence to take over disk drive(s) from the primary controller by requesting for ownership of the disk drive(s) previously serviced by the primary controller. In response to the ownership request, the FST will grant the ownership to the requesting storage controller by updating its current owner identifier data.

To avoid a race condition between the storage controllers, the FST may be configured to deny an ownership request from a controller if a previous ownership request was granted within a predefined period of time. The term "race condition" is used in the context of the present invention to describe a situation where each storage controller repeatedly requests for ownership, in an alternating fashion between two or more controllers, based on an incorrect assumption that the other controller is down.

In conventional redundant controller storage systems with a heartbeat mechanism, the controllers have no way of communicating with each other when the heartbeat mechanism is down. In the present invention, the controllers may imply that the interruption of the heartbeat signal is actually caused by failure in the heartbeat mechanism via indirect communication established over a FST 506. For example, if the heartbeat mechanism is down, both storage controllers will constantly ask for ownership of disk drive(s) based on its initial assumption that the other controller is down, and consequently, the ownership will switch back and forth between the controllers. After the ownership has switched back and forth several times, each controller will realize that the other controller is very much active and conclude that the heartbeat mechanism is down. Based on this conclusion, each controller will hold on to its own (default) disk drives until it receives an indication that the heartbeat mechanism is functioning properly.

Figure 6:
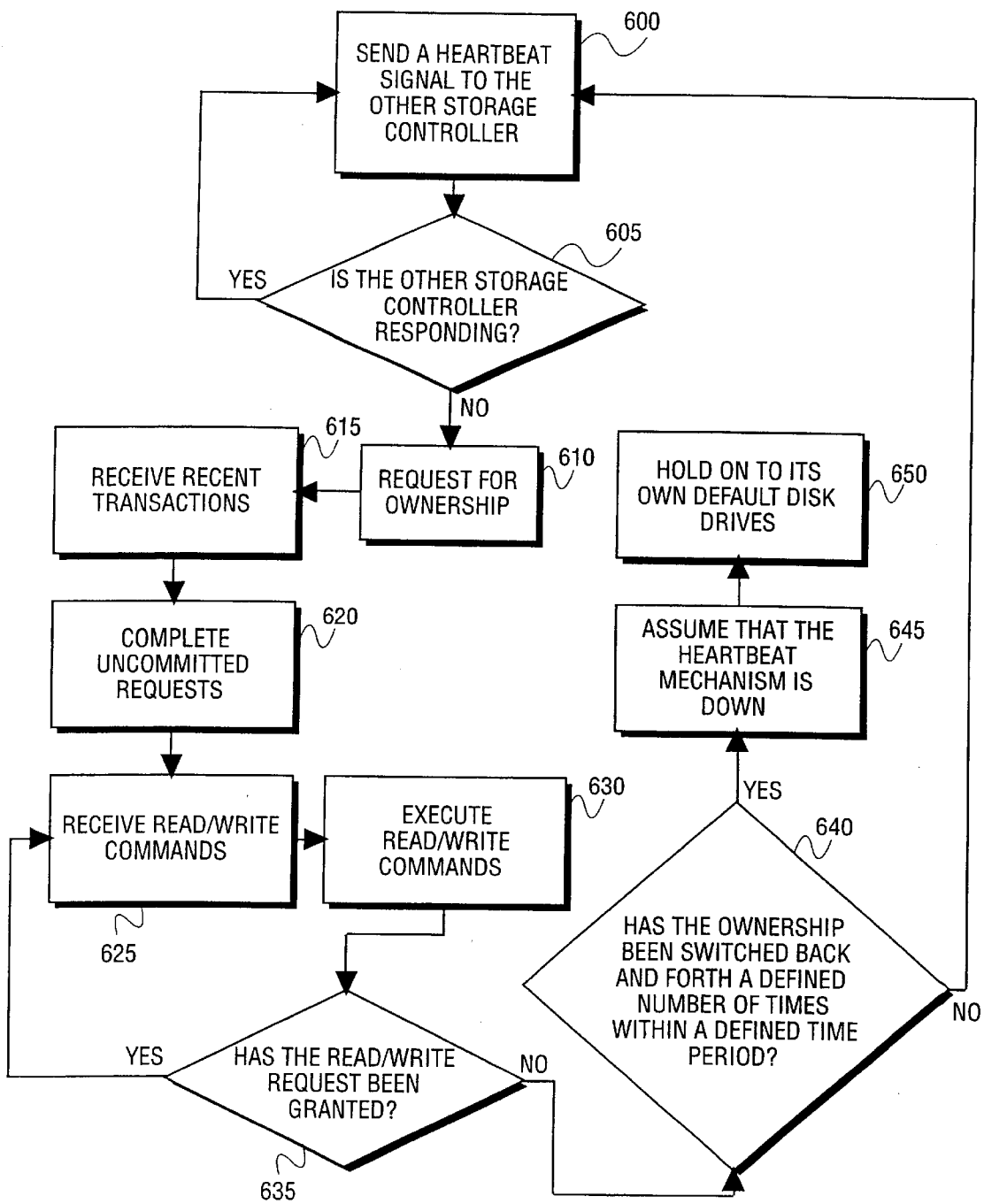
FIG. 6 is a flowchart diagram illustrating failover operations of a storage controller according to one embodiment of the present invention.

FIG. 6 is a flowchart of operations of a storage controller according to one embodiment of the present invention. When the storage system first boots up, a default mapping is used by FSTs to determine which storage controller owns which disk drives. In blocks 600–605, each storage controller periodically sends a heartbeat signal (e.g., "ping" signal) to determine if the other controller is active. If one of the controllers (e.g., failing controller) does not respond to its pinging signal (block 605, no), the other storage controller (e.g., surviving controller) will initially assume that the other controller has failed and will request for ownership of one or more of the disk drives (or all disk drives) currently owned by the non-responsive controller (block 610). The surviving controller may determine which disk drives are currently owned by the failing controller by querying one or more of the FSTs (or all FSTs). As noted earlier, each FST maintains current owner identifier data to identifier the current owner of the disk drive(s) it is associated with. The current owner identifier data may be used by the surviving controller to identify all the disk drives that are currently owned by the failing controller.

Upon requesting for an ownership of the disk drives owned by the failing controller, the surviving controller will receive a list of recent disk access requests committed for each disk drive from a corresponding FST (block 615) and use this information to complete the uncommitted requests properly (block 620). At this point, the storage controller proceeds in a loop (block 625–635) to receive and execute read/write commands issued by the processor. If the disk access request made by the storage controller is denied by the FST (block 635, no), the storage controller proceeds to block 640 to determine if the non-responding controller has actually failed. In one embodiment, this may be accomplished by determining if the ownership has switched back and forth a defined number of times within a defined time period. Accordingly, if a race condition is detected by the storage controller (block 640, yes), the storage controller will realize that the other controller is active and will assume at this point that the heartbeat mechanism is down (block 645). In one embodiment, each controller will hold on to its own (default) disk drives once failure in the heartbeat mechanism is detected.

In accordance with a further aspect of the invention, the FST may be configured to serve as a second channel of communication between the storage controllers in the case of heartbeat mechanism failure. In one implementation, the FST is configured to inform any one controller of access attempts made by other controllers and ownership requests made by the other controller, making it possible for both controllers to detect race conditions. In another implementation, the FST is configured to decide which storage controller will own which disk drives in the event a race condition is detected.

Figure 7:
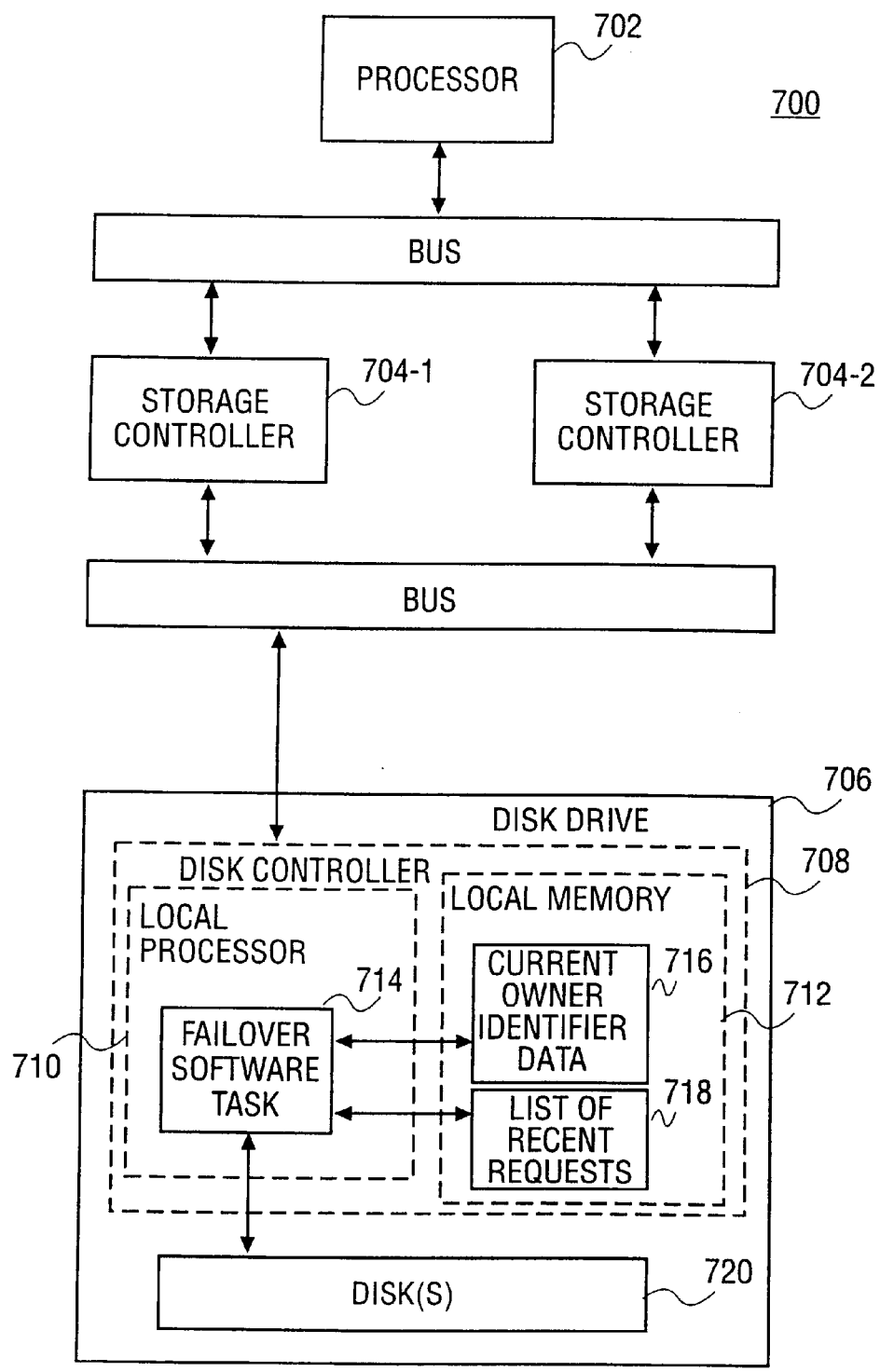
FIG. 7 is a block diagram of a disk drive according to one embodiment of the present invention.

FIG. 7 depicts a disk drive 706 according to one embodiment of the present invention. The disk drive 706 is in communication with a host processor 702 via at least two storage controllers 704-1 and 704-2. The disk drive 706 generally includes one or more disks 720 for storing data and a disk controller 708 having a local processor 710 and a local memory 712. According to one aspect of the present invention, a failover software task (FST) 714 is executed by the local processor in the disk controller. The FST 714 is in communication with the storage controllers 704-1 and 704-2 and allows disk access to only one of the storage controllers with ownership of the disk at any one time. In one embodiment, the FST 714 serves as a gatekeeper to prescreen each request to access the disk by verifying whether a storage controller identification number associated with the storage controller requesting access matches with a current owner identifier data 716 previously stored in the local memory of the disk controller. The FST 714 also maintains a list of recent requests 718 which contains information with regard to those recent requests that have been received from the controller with ownership and have been committed to the disk(s) 720.

While the foregoing embodiments of the invention have been described and shown, it is understood that variations and modifications, such as those suggested and others within the spirit and scope of the invention, may occur to those of ordinary skill in the art to which the invention pertains. The scope of the present invention accordingly is to be defined as set forth in the appended claims.

What is claimed is:

1. A system comprising:
   at least two storage controllers for coupling to a processor; and
   a failover manager in communication with said at least two storage controllers and a storage device, wherein in response to one of the storage controllers making a request to access the storage device, said failover manager selectively grants access to the storage device based on whether or not the requesting storage controller has ownership of the storage device.

2. The system of claim 1, wherein said failover manager maintains a list of requests that have been committed to the storage device, said list of requests is accessed during failover to assist one of the storage controller with new ownership to complete uncommitted requests properly.

3. The system of claim 1, wherein said failover manager prescreens each request to access the storage device by reading a storage controller identification number associated with the storage controller requesting access and comparing said storage controller identification number with a current owner identifier data previously stored in a memory.

4. The system of claim 1, wherein said failover manager is embodied in the form of a software task executed by a processor included in a disk controller of said storage device.

5. The system of claim 1, wherein said failover manager is embodied in the form of a software task executed by a processor included in an electronic unit coupled between said storage controllers and said storage device.

6. The system of claim 1, wherein in response to a request for ownership of said storage device from one of said storage controllers, said failover manager revokes current ownership and grants ownership to the storage controller that requests ownership of said storage device.

7. The system of claim 1, wherein failure of the storage controller with ownership is detected by the processor and upon detecting the failure, a failover command is issued by the processor to another one of said storage controllers to request ownership and assume interfacing operations between said storage device and said processor.

8. The system of claim 1, further comprising a heartbeat mechanism to transmit a heartbeat signal between said storage controllers to keep each controller informed that the other controller is operating properly, wherein each of said storage controllers is configured to initiate an ownership request and assume interfacing operations of the other storage controller once an interruption of the heartbeat signal is sensed.

9. The system of claim 8, wherein said failover manager is configured to inform any one storage controller of an access attempt or an ownership request made by any other storage controller.

10. The system of claim 8, wherein said failover manager is configured to decide which one of said storage controllers will own said storage device in the event a race condition is detected.

11. A disk drive for use with a host computer having at least two storage controllers, comprising:
    a disk for storing data;
    a disk controller having a processor and a memory;
    a software task executed by said processor, said software task in communication with the at least two storage controllers, wherein when one of the storage controllers makes a request to access said disk, said software task grants access to said disk to only the storage controller with ownership of said at least one disk at any one time.

12. The disk drive of claim 11, wherein said software task maintains a list of requests that have been committed to said at least one disk and transmits said list of requests to one of the storage controllers requesting ownership.

13. The disk drive of claim 11, wherein said software task prescreens each request to access the disk by reading a storage controller identification number associated with said storage controllers requesting access and comparing said storage controller identification number with a current owner identifier data previously stored in the memory of the disk controller.

14. The disk drive of claim 11, wherein in response to a request for ownership from one of said storage controllers, said software task revokes current ownership and grants ownership to the storage controller that requests ownership of said disk.

15. A method of failing over a storage device between at least two storage controllers, comprising:
    assigning one of said storage controllers ownership of said storage device;
    detecting that said storage controller having ownership of said storage device has failed;
    in response to detecting of failure of said storage controller having ownership, assigning another one of said storage controllers ownership of said storage device; and in response to one of the storage controllers making a request to access the storage device, selectively granting access to the storage device based on whether or not the requesting storage controller has ownership of the storage device.

16. The method of claim 15, further comprising maintaining a list of requests that have been committed to said storage device.

17. The method of claim 16, further comprising using said list of requests that have been committed to the storage device by said another storage controller to complete uncommitted requests properly.

18. The method of claim 15, further comprising deleting all requests made by a previous owner that have not been committed to the storage device.

19. The method of claim 15, wherein said allowing only said storage controller having ownership to access said storage device further comprises:

reading a storage controller identification number associated with the storage controller requesting access; and comparing said storage controller identification number with a current owner identifier data previously recorded in a memory.

20. The method of claim 15, wherein said detecting that the storage controller having ownership has failed is performed by a host processor.

21. The method of claim 15, wherein said detecting that the storage controller having ownership has failed is determined by the other storage controller when said storage controller having ownership is unresponsive to a heartbeat signal.

22. The method of claim 15, wherein the ownership of the storage device is maintained by a software task executed by a processor included in a disk controller of said storage device.

23. A fault tolerant storage system comprising:

at least two storage controllers, each of said storage controllers to provide interfacing operations between a processor and at least one storage device;

means for assigning ownership of the at least one storage device to one of said storage controllers;

means for detecting failure of one of said storage controllers having ownership;

means for changing ownership from the storage controller having ownership to another storage controller upon detection of failure of the storage controller having ownership; and means for selectively granting access to the storage device in response to one of the storage controllers making a request to access the storage device, wherein the access to the storage device is selectively granted based on whether or not the requesting storage controller has ownership of the storage device.

24. The fault tolerant storage system of claim 23, further comprising means for maintaining a list of recent requests that have been committed to the storage device, wherein said list of recent requests is accessed during failover to assist a new owner to complete the uncommitted requests properly.

25. The fault tolerant storage system of claim 23, further comprising means for blocking any access attempts made by other storage controllers without ownership.

26. The fault tolerant storage system of claim 23, wherein ownership of the storage device is maintained by a software task executed by a local processor included in a disk controller of said storage device.

27. The fault tolerant storage system of claim 23, wherein said means for detecting failure in said storage controllers comprises a heartbeat mechanism provided between said at least two storage controllers.

* * * * *